April 14, 1959  P. SPENCE  2,881,792
REGULATING-VALVE MEANS
Original Filed March 7, 1952  2 Sheets-Sheet 1

Inventor
PAULSEN SPENCE
By Mitchell & Bechert
Attorneys

Inventor
PAULSEN SPENCE
By Mitchell & Bechert
Attorneys

United States Patent Office 2,881,792
Patented Apr. 14, 1959

2,881,792

REGULATING-VALVE MEANS

Paulsen Spence, Baton Rouge, La.

Original application March 7, 1952, Serial No. 275,275, now Patent No. 2,787,285, dated April 2, 1957. Divided and this application January 31, 1957, Serial No. 639,606

5 Claims. (Cl. 137—489.5)

My invention relates to pressure-regulating systems and, in particular, to those which must supply relatively large quantities of pressure fluid to a remote load. The present application is a division of my original application, Serial No. 275,275, filed March 7, 1952, now Patent No. 2,787,285.

In heating systems for large buildings or for other substantial steam loads, difficulty is often encountered in bringing the system from zero to full load. In an apartment or office building, for example, the heating plant may be shut down during the night hours; but, when the steam is first supplied to the system in the morning, the main regulating valve and all auxiliary regulating valves will demand the utmost flow of steam until the entire system has been supplied. This demand may occasion undesirable transients before the regulating system reaches equilibrium or some satisfactory operating point. These transients may be the cause of banging or other noise throughout the supply system, and undue mechanical wear and damage may also result.

It is, accordingly, an object of the invention to provide an improved pressure-regulating system of the character indicated.

It is another object to provide an improved pressure-regulating system wherein steam may be safely supplied to a large load without encountering undue transients.

It is also an object to provide an improved pressure regulating system in which the normal regulating point may be advanced in stepped increments, so as to permit the subsidence of relatively small transients for each increment before advancing to the next increment of regulated pressure.

It is a further object to provide an improved pressure-regulating system wherein the regulating point is automatically controlled in accordance with a given change in a detected physical quantity, as sensed at the load supplied by the said regulating means.

It is a specific object to provide a pressure-regulating means meeting the above objects and incorporating a timing mechanism assuring the lapse of a pre-selected time between incremental changes in the regulating point of the system.

Another specific object is to provide an improved pressure-regulating system wherein the rate of flow of pressure fluid governed by the regulating means may determine the regulating point thereof.

Other objects and various further features of the invention will be pointed out or will occur to those skilled in the art from a reading of the following specification, in conjunction with the accompanying drawings, which show, for illustrative purposes only, preferred forms of the invention:

Briefly stated, my invention contemplates an improved pressure-regulating system including a main valve and regulating means for said main valve. The regulating means may include pressure-operated pilot-valve means, and I provide automatic preloading means for biasing the operating point of the regulating means in a sequence of biasing increments. The pressure-responsive actuating means for the pilot valve may include a control-pressure connection down-stream from the main valve. In one general form of the invention, the automatic preloading means includes means for stepping the bias on the pilot valve in given biasing increments at predetermined timing intervals. The timing means may be a motor; alternatively, it may be a float rising in a reservoir that is being filled at a predetermined rate. In another general form of the invention, a given physical quantity characteristic of the fluid at the load must attain some magnitude before an incremental bias is applied to the pilot valve. If desired, a flow-rate governor may be incorporated in the system to assure that the regulating system will not supply pressure fluid at more than a given rate of flow.

Figure 1:
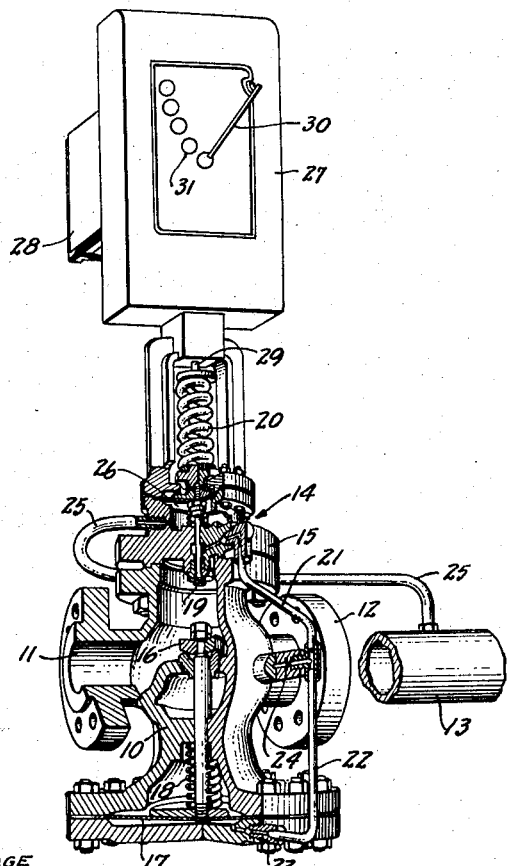
Fig. 1 is a perspective view of important elements of a regulating system incorporating features of the invention, a portion of the main-valve body being cut away and shown in section.

Referring to Fig. 1 of the drawings, my invention is shown in application to a main valve having a body 10 with an inlet connection 11 and an outlet connection 12. The outlet may be connected to a conduit 13 for supplying pressure fluid downstream, as to a remote load (not shown). The main-valve structure shown incorporates pressure-operated pilot means 14 integral with the bonnet 15 thereof. Such structure is shown and described in greater detail in my copending patent application, Serial No. 759,809, filed July 9, 1947, now Patent No. 2,639,556, reference to which may be had for a more complete structural description.

The main valve 10 includes a disc 16 for passing pressure-fluid from the inlet 11 downstream to the conduit 13. Pressure-responsive actuating means for the disc 16 may include a flexible diaphragm 17. Spring means 18 normally urge the valve disc 16 to closed position.

The pilot valve 14 may include a pilot-valve disc 19, normally urged by compression spring 20 to an open position, so as to pass high-pressure fluid (from upstream of the main-valve disc 16) past the pilot member 19 and via pipe connections 21—22 to the active face of diaphragm 17. The connection 23 between pipe 22 and the space over diaphragm 17 may include a bleed, and bleed means 24 are also preferably provided between one of the connections 21—22 and the downstream or outlet side of the main valve. Control of the regulating point for the described elements may be effected by pressure developed in line 25, working over pilot diaphragm 26 and in opposition to the biasing force of spring 20.

In accordance with a feature of the invention, the control pressure supplied in line 25 is derived from a point downstream from the main valve, as by the connection shown to the conduit 13; at the same time, means are provided for changing the bias of spring 20 in automatically controlled increments. In the form shown in Fig. 1, I employ a so-called motor positioner 27 for variously preloading or biasing the spring 20; it suffices to say that the device 27 includes motor or timing means 28 for determining intervals at which the actuating stem 29 will be driven downwardly and in incrementally greater biasing relation with the spring 20. The motor positioner shown has five positions and, therefore, adjusts the load on the biasing means 20 in corresponding incremental steps, as indicated by an external arm 30, which may swing with each step to indicate the point at which the system is operating at any given time.

In operation, a heating system equipped with the described device will, when cold, have the relation of parts shown. When steam under high pressure is first delivered to the main valve at inlet 11, the motor 28 must be started. High-pressure steam will be admitted past pilot-valve member 19 and delivered to the diaphragm 17, so as to open the main-valve member 16. The initial setting of the motor positioner 27 will produce a relatively light biasing load at 29 on the spring 20, so that the valve will be regulated about a relatively low-pressure point, by means of the downstream control-pressure pick-up at 25.

After the lapse of a given interval of time, as determined by a motor (28) setting appropriate to the system being supplied by the regulating means of Fig. 1, the positioner 27 will be automatically operated to project its actuating stem 29 downwardly by a relatively small increment, thereby increasing the load on spring 20 and determining a correspondingly higher regulating pressure. With this projection of stem 29, the indicator 30 may be advanced to the second step, opposite the mark 31.

After a further lapse of time, as determined by an appropriate setting of the motor 28, the stem 29 will be automatically further depressed so as again to raise the regulating point of the system by a predetermined incremental amount. The process will be automatically repeated for each motor-controlled advance of the positioner 27 until such time as the full-load operating point is reached. For most satisfactory operation, it will be understood that the number of incremental advances provided by the positioner 27 should be adequate for the load system to be supplied by the regulating means; in other words, each increase in regulated pressure (for each biasing increment determined by the positioner 27) is preferably an increment that can be smoothly handled by the system.

Figure 2:
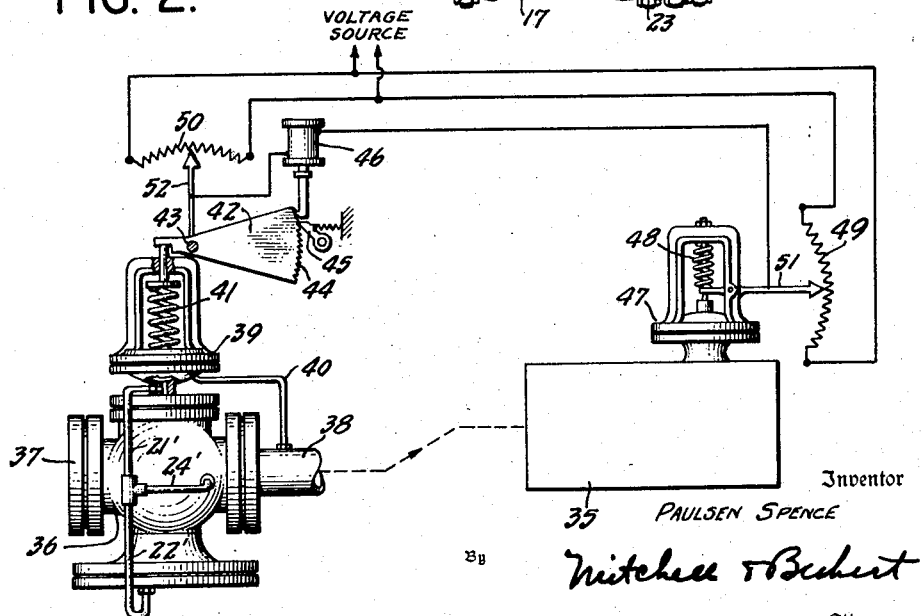
Fig. 2 is a diagram schematically illustrating an alternative regulating system of the invention.

In Fig. 2, I show an alternative arrangement in which pressure supplied to a given load 35 is brought up in step increments, in accordance with the ability of that load to absorb each new increment of pressure; only when there has been a preselected absorption of each new pressure change will the regulating system be incrementally changed to permit a further charge to the load. The regulating means may, in general, resemble that discussed above in connection with Fig. 1; thus, main valve 36 may be supplied with high-pressure steam at an inlet 37, and regulated pressure to the load may be delivered in a downstream or outlet line 38. An integral pilot 39 may be controlled by downstream pressure, as picked off by line 40. Pilot-controlled pressures for actuating the diaphragm of valve 36 may be conveyed by lines 21', 22', and 24', corresponding to the parts 21—22—24 of Fig. 1.

The pilot valve 39 may include biasing means 41 in the form of a spring to be variously preloaded. The preloading means schematically shown includes a rocker 42, pivoted at 43 and having one end in loading relation with the spring 41. The other end of rocker 42 may carry an arc of ratchet teeth 44, and pawl means 45 may hold a given ratcheted position of rocker 42. Solenoid means 46 is shown for producing incremental ratcheted advances of the rocker 42 and, therefore, incremental loading of the spring 41.

At the load end of the system, I provide sensing means responsive to some physical quantity that is characteristic of or responsive to each incremental charge of steam. Such means may be a thermostatically-operated device, but in the form shown I employ pressure-responsive means 47, such as a diaphragm loaded by a spring 48.

Various means may be employed to translate preselected displacements of diaphragm 47 into ratcheted advances in the preload setting of rocker 42, but in the form shown I have employed an electrical null-finding system. The null-finding system may employ an electrical bridge consisting of similar impedances 49—50 supplied by a common source. Contact arms 51—52 (connected respectively to sense position of diaphragm 47 and of rocker 42) may scan impedances 49—50. Solenoid 46 may be connected to operate upon attainment of a preselected electrical unbalance in the bridge.

In operation, the arm 42 will first have been set for the lightest preload on spring 41, so that valve 36 will be regulated at a relatively low operating point. Only relatively low-pressure steam will then be allowed to pass in line 38 to load 35. When attainment of this low pressure is sensed by the diaphragm 47 and follower arm 51, there will be sufficient electrical unbalance in the bridge 49—50 to actuate solenoid 46 and thus incrementally to advance the operating point of valve 36. This incremental loading cycle will be repeated with each new charge of pressure fluid to the load and until such time as the load has been brought up to full pressure, as will be understood.

Figure 3:
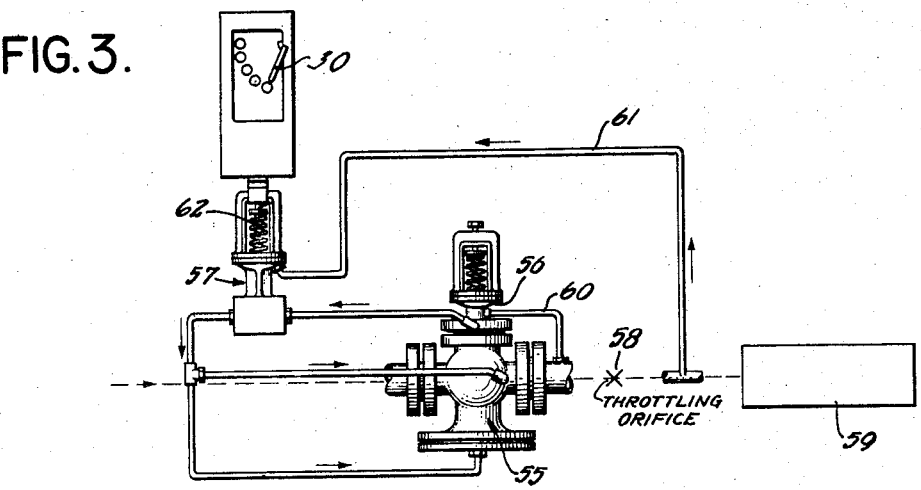
Figs. 3, 4, and 5 are similarly schematic, showing still further alternatives.

In Fig. 3, I schematically show a further modification incorporating features of the invention. In the arrangement of Fig. 3, the regulating point for main valve 55 is determined by two pressure pilots 56—57 connected in series-controlling relation with the diaphragm of the main valve, and deriving their sensing pressures across a throttling means 58. The throttling means 58 may be provided between the main valve 55 and the load 59. Thus, the pressure-responsive actuating means of one pilot valve (56) may be connected by line 60 to a point intermediate to main valve 55 and the throttling means, and the other pressure pilot 57 may be similarly connected by line 61 to the downstream side of the throttling means.

It will be seen that the first pilot 56 may serve the function of limiting development of transiently high pressures between the main valve 55 and the throttle orifice, while the second pilot valve 57 may serve the function of ultimately regulating the valve 55, in accordance with delivered pressure, that is, pressure delivered to the load 59. This delivered pressure may represent one of a series of incremental advances in a succession of pressures involved in bringing the system up to full-pressure operation, and in the form shown I have employed a motor positioner 27' similar to that described in Fig. 1 for automatically advancing the preloaded condition of spring means 62 in the pilot valve 57.

Figure 4:
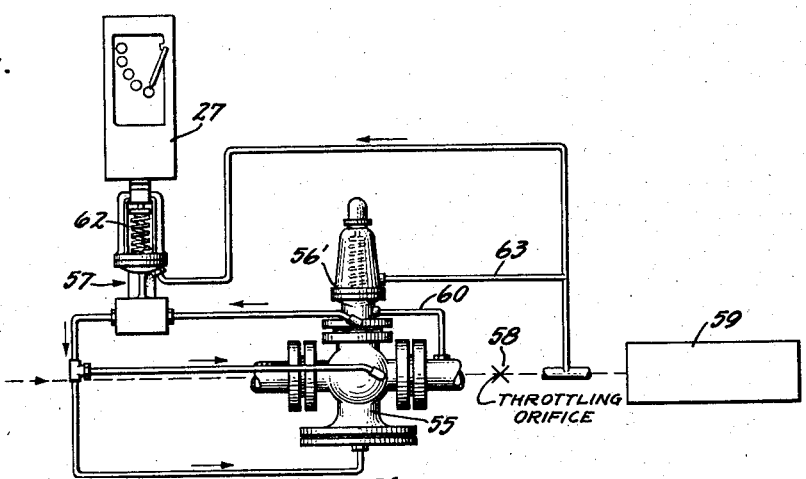

The construction of Fig. 4 generally resembles that of Fig. 3, and corresponding parts have therefore been given the same reference numbers. In Fig. 4, however, the first pilot 56' is a differential-pressure pilot and has been employed to limit a given regulating point for the main valve 55, in accordance with the rate of flow of steam passing the throttling means 58. This high-pressure side of the actuating means for pilot valve 56' may be connected by line 60 to a point intermediate the main valve 55 and the throttling means 58, and the low-pressure side thereof may be connected by line 63 to the downstream side of the throttling means 58.

Figure 5:
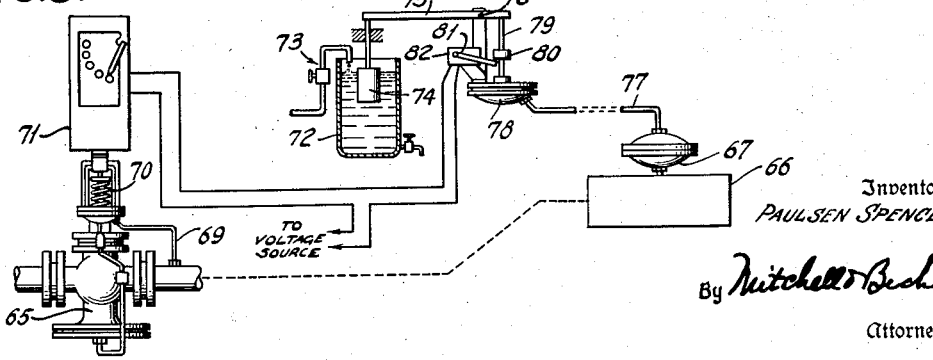

In Fig. 5, I show still a further embodiment of the invention where the gradual and progressive build-up of steam supplied by regulating valve 65 is automatically governed not only in accordance with a timing mechanism but also in accordance with the actual absorption of energy by the load. In Fig. 5 the load is schematically designated at 66 where pressure-responsive means, such as a diaphragm 67, is located, in order to sense the delivered pressure.

The regulating valve 65 may be as described in Fig. 1; that is, it may include a pressure-pilot 68 integral with the valve bonnet and utilize downstream pressure, sampled by line 69, to regulate the valve about a particular point determined by the compressional loading of spring 70. A device 71 is provided for incrementally loading the spring 70, but, unlike the device 27 of Fig. 1, the device 71 is operated through the combined control of a timer and of the delivered pressure, as sensed at 67.

In the form shown, the timer is hydraulically operated and includes a vessel 72 with means 73 for controlled gradual admission of water or other fluid into the vessel 72. A float 74 is supported for guided vertical movement in accordance with the rising fluid level in vessel 72, and is in actuating relation with a beam 75 pivoted at 76. The beam 75 serves for differentially combining the response of the timing means 72—73—74 with the response of the pressure-sensing means 67. If the timing means should be located near the regulating valve or at least remote from the pressure-sensing means 67, then I may employ an incompressible-fluid line 77 to relay the position or pressure on diaphragm 67 through a further diaphragm 78 for displacement of a stem 79 in opposition to the force derived from float 74. A collar 80 on stem 79 may be carried with movement of stem 79 and poised to actuate the arm 81 of an electric switch 82 upon attainment of a given down position. The switch 82 is shown in electrical controlling relation with the spring-tensioning device 71, and the arrangement is such that for each actuation of switch 82 the device 71 is stepped by one increment so as to provide a correspondingly increased compressional force against spring 70.

In operation, beginning with a cold system, the vessel 72 will have been drained to a low level, and water or other fluid will be introduced by means 73 at the desired control rate. Spring-tensioning device 71 will have been adjusted for minimum bias so that valve 65 regulates about its lowest point, supplying relative low pressure to the load 66. As the load 66 absorbs the received pressure, diaphragm 78 will raise stem 79 against the buoyancy of float 74; and, should this occur prior to the lapse of a predetermined sufficient time, then nothing further will happen until the sufficient time has elapsed, so as to exert a sufficient buoyant force on float 74 to depress the collar 80 against diaphragm 78 until switch 82 is actuated. Device 71 will immediately respond to advance the preload of spring 70 to the next stepped position, and the valve 65 will be regulated to deliver another increment of pressure to the load 66. Again, pressure-responsive means 78 will raise stem 79 against the buoyancy of float 74 as pressure is received at the load 66, and only when there has been the desired lapse of time will the beam 75 be rocked to actuate switch 82 for initiation of the next cycle of increased regulating pressure. The process will repeat until the full pressure has been supplied to the load, at which time the timing means 73 may be turned off and the vessel 72 emptied in readiness for the next need to supply a cold system.

It will be appreciated that I have described relatively simple means for establishing the safe and progressive pressurizing of a load, particularly of a large load located remotely from a high-pressure steam supply system. The incremental build-up of steam pressure in the system may be governed purely by timing means or purely by the actual delivered pressure, or differentially by both.

While I have described my invention in detail for the preferred forms shown, it will be understood that modifications may be made within the scope of the invention as defined by the following claims.

I claim:

1. In a pressure-regulating system of the character indicated, a main valve, regulating means for said main valve and including a pilot valve, said pilot valve including a control-pressure connection downstream from said main valve, load means downstream from said main valve for receiving fluid passed downstream by said main valve, and biasing means including resilient loading means for said pilot valve, whereby the regulated point of said main valve may be determined; said biasing means including electrical means electrically responsive to a given physical characteristic at said load, and a biasing motor connected to said electrically responsive means and in variable loading relation with said loading means.

2. In a pressure-regulating system of the character indicated, a main valve, regulating means for said main valve and including a pilot valve, pressure-responsive actuating means for said pilot valve and including a control-pressure connection downstream from said main valve, biasing means for said pilot valve, load means downstream from said main valve and connected for supply by said main valve, and feed-back means responsive to a physical characteristic at said load means and in variable biasing relation with said biasing means.

3. In a pressure-regulating system of the character indicated, a main valve, regulating means for said main valve and including a pilot valve, pressure-responsive actuating means for said pilot valve and including a control-pressure connection downstream from said main valve, biasing means for said actuating means, and pressure-responsive means for varying the bias of said biasing means in response to attainment of a given pressure increment at a load supplied by said main valve.

4. A system according to claim 3, in which said last-defined means includes an electrically operated null-finding system, and in which means responsive to a given increment of electrical unbalance in said null-finding system is connected in actuating relation with said biasing means.

5. In a pressure-regulating system, a main valve, regulating means for said valve and including a pilot valve, pressure-responsive actuating means for said pilot valve and including a control-pressure connection downstream from said main valve, biasing means for said actuating means, load means downstream from said control-pressure connection and connected for supply by said main valve, a pressure-responsive element connected to said load means, timing mechanism for varying the control level of said pressure-responsive element as a function of time, and means responsive to said varied control level for varying the effective bias of said biasing means.

References Cited in the file of this patent

UNITED STATES PATENTS

| | | |
|---|---|---|
| 193,515 | Isbell | July 24, 1877 |
| 1,701,865 | Soderberg | Feb. 12, 1929 |